United States Patent [19]

Kiefer

[11] Patent Number: 5,564,569
[45] Date of Patent: Oct. 15, 1996

[54] PACKAGE

[75] Inventor: Günther Kiefer, Schwaigern, Germany

[73] Assignee: Adolf Illig Maschinenbau GmbH & Co., Heilbronn, Germany

[21] Appl. No.: 371,865

[22] Filed: Jan. 12, 1995

[30] Foreign Application Priority Data

Jan. 24, 1994 [DE] Germany .................. 9401117 U

[51] Int. Cl.⁶ ..................................... B65D 25/24
[52] U.S. Cl. ............................. 206/461; 220/633
[58] Field of Search ..................... 206/45.18, 45.24, 206/45.25, 45.26, 45.27, 461–471; 220/633

[56] References Cited

U.S. PATENT DOCUMENTS

| | | |
|---|---|---|
| 3,093,244 | 6/1963 | Middleton, Jr. et al. . |
| 3,685,649 | 8/1972 | Diehl . |
| 3,776,375 | 12/1973 | Rohdin . |
| 4,133,429 | 1/1979 | Kuchenbecker . |
| 4,171,050 | 10/1979 | Murray et al. . |
| 4,531,637 | 7/1985 | Cusmano . |
| 4,749,082 | 6/1988 | Gardiner et al. . |
| 4,781,289 | 11/1988 | Perkins . |
| 4,784,268 | 11/1988 | Perchak . |
| 4,901,858 | 2/1990 | Anderson . |

FOREIGN PATENT DOCUMENTS

| | | |
|---|---|---|
| 0403373 | 12/1990 | European Pat. Off. . |
| 9202235 | 5/1992 | Germany . |
| 9202505 | 8/1992 | Germany . |
| 9205433 | 7/1993 | Germany . |

*Primary Examiner*—Jimmy G. Foster
*Attorney, Agent, or Firm*—Spencer & Frank

[57] ABSTRACT

A package includes a planar base part, a hood part including a top wall and a plurality of side walls oriented at an angle to each other and the top wall. A flap joins each side wall and extends angularly therefrom. The flaps are secured face-to-face to the base part. There are further provided first and second panels carried by two oppositely located side walls, each projecting beyond a plane of a side wall which interconnects the oppositely located side walls. The interconnecting side wall extends toward an external edge of the base part. Such external edge of the base part and the external edges of the first and second panels define a standing plane for an upright positioning of the package on a supporting surface.

5 Claims, 4 Drawing Sheets

1

PACKAGE

CROSS REFERENCE TO RELATED APPLICATION

This application claims the priority of German Application No. G 94 01 117.6 filed Jan. 24, 1994, which is incorporated herein by reference.

BACKGROUND OF THE INVENTION

This invention relates to a package formed of a planar base part and an angled hood part which are connected to one another and between which the contents of the package are accommodated. The hood part has a planar roof and inclined side walls with outwardly extending flaps secured to the planar base part. For purposes of recycling, the two parts are of the same material, usually cardboard or plastic.

German Gebrauchsmuster (utility model) GM 92 05 435 discloses a package in which the hood part has a flat top wall and four side walls each having a flap bonded to the planar base. The package is provided with an aperture for suspension from a hook or the like. If it is attempted to set such construction upright on an edge thereof which is opposite from the aperture, the package would tip over or would, at best, stand at a substantially oblique orientation. Thus, such structures are adapted only for suspension.

To ensure that the package is able to stand in an approximately vertical orientation, it would be necessary to omit one of the flaps normally provided on the side wall oriented towards the supporting surface and such wall should be connected flush with the outer edge of the planar base part. In such a case, however there would be no connection at that side between the planar base part and the side wall of the hood part. The package would be unstable and the contents could drop out of the package at this location or could be removed by unauthorized persons. An inward angling of the flap makes more difficult its securement to the planar base part because a connection could no longer be effected by sealing, welding or gluing under pressure.

SUMMARY OF THE INVENTION

It is an object of the invention to provide an improved package of the above-outlined type where all the side walls of the hood part, thus including the side wall which, when the package stands upright, faces the package supporting surface, are connected by means of an angularly outwardly bent flap with the planar base part and, in spite of such a construction, it is feasible to set the package on a supporting surface such that the base part is oriented substantially perpendicularly to the supporting surface.

It is a further object of the invention that the package structure permits a package making, according to which the hood part is positioned at the outlet of a simple and operationally reliable dispenser which deposits the goods into the inverted hood part and then the flat base part is positioned on the inverted hood part and both parts are connected to one another, for example, by sealing.

It is a further object of the invention to provide a stable package without risks that the contents can easily drop out or be removed from the package.

It is a further object of the invention to allow an easy making of the package blank and the angled shaping of the hood part.

These objects and others to become apparent as the specification progresses, are accomplished by the invention, according to which, briefly stated, the package includes a planar base part, a hood part including a top wall and a plurality of side walls oriented at an angle to each other and the top wall. A flap joins each side wall and extends angularly therefrom. The flaps are secured face-to-face to the base part. There are further provided first and second panels carried by two oppositely located side walls, each projecting beyond a plane of a side wall which interconnects the oppositely located side walls. The interconnecting side wall extends toward an external edge of the base part. Such external edge of the base part and the external edges of the first and second panels define a standing plane for an upright positioning of the package on a supporting surface.

According to the invention, the panels are so configured that their outer edge or a partial region of their outer edge extends approximately to an outer edge of the planar base part and is essentially perpendicular thereto. When placing the package upright it stands on the lower edge of the planar base part and on the outer edges of the two panels.

DESCRIPTION OF THE PREFERRED EMBODIMENTS

Figure 1:
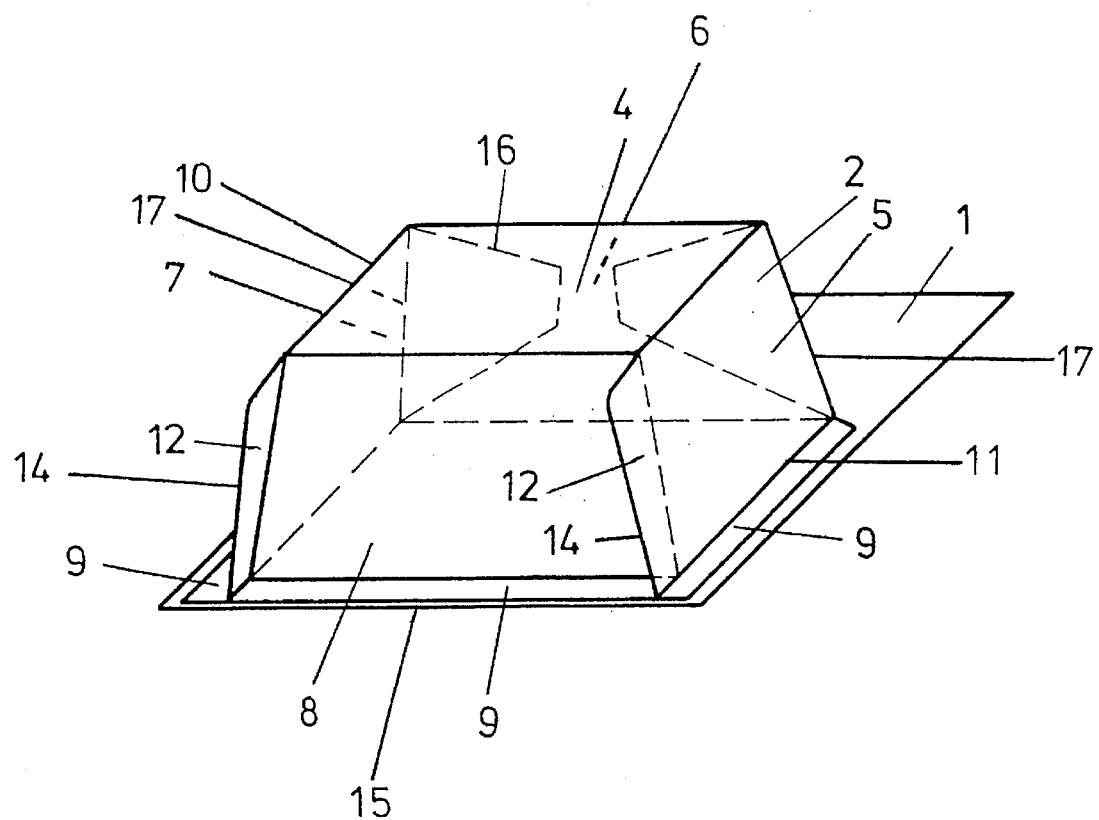
FIG. 1 is a perspective view of a preferred embodiment of the invention.

The package according to the invention as illustrated in FIG. 1 is formed of two parts made of cardboard or synthetic material, namely a planar base part 1 and a hood part 2 between which the contents 3 (shown in FIG. 2) are accommodated. The parts 1 and 2 are connected to one another. The hood part 2 has a flat top wall 4 and four inclined side walls 5, 6, 7 and 8. Each side wall 5–8 has an offstanding flap 9. The side walls 5–8 join the top wall 4 at respective edges 10 and the flaps 9 join the associated side walls at respective edges 11 at such an angle that the part 2 has shape of a hood and the flaps 9 extend parallel to the planar base part 1. The hood part 2 is affixed to the base part 1 at the flaps 9 by sealing, welding, gluing, stapling or riveting.

Figure 2:
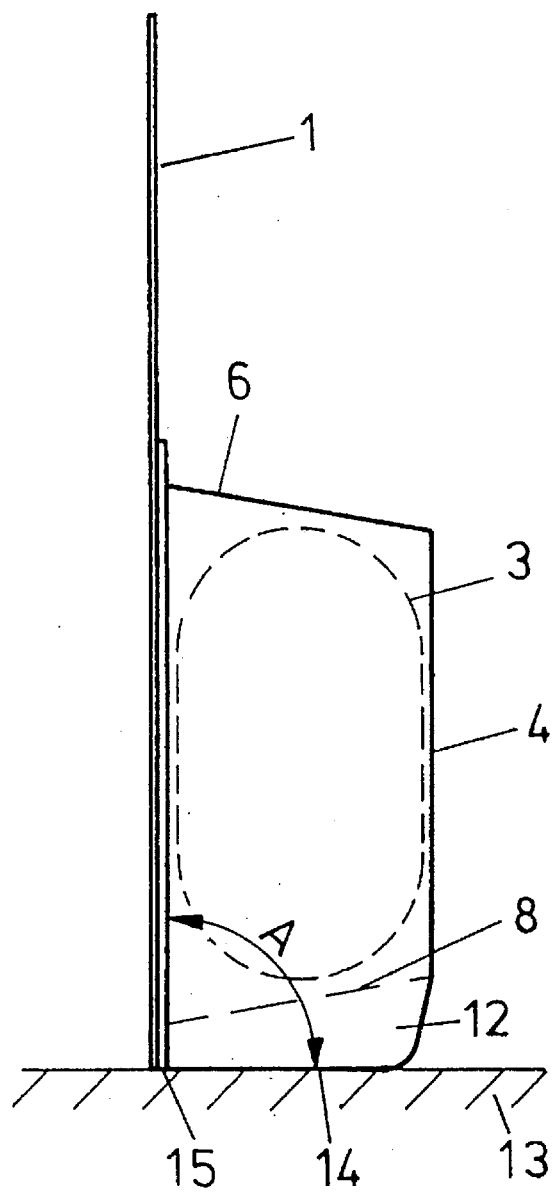
FIG. 2 is a side elevational view of the upright standing package of FIG. 1.
Figure 3:
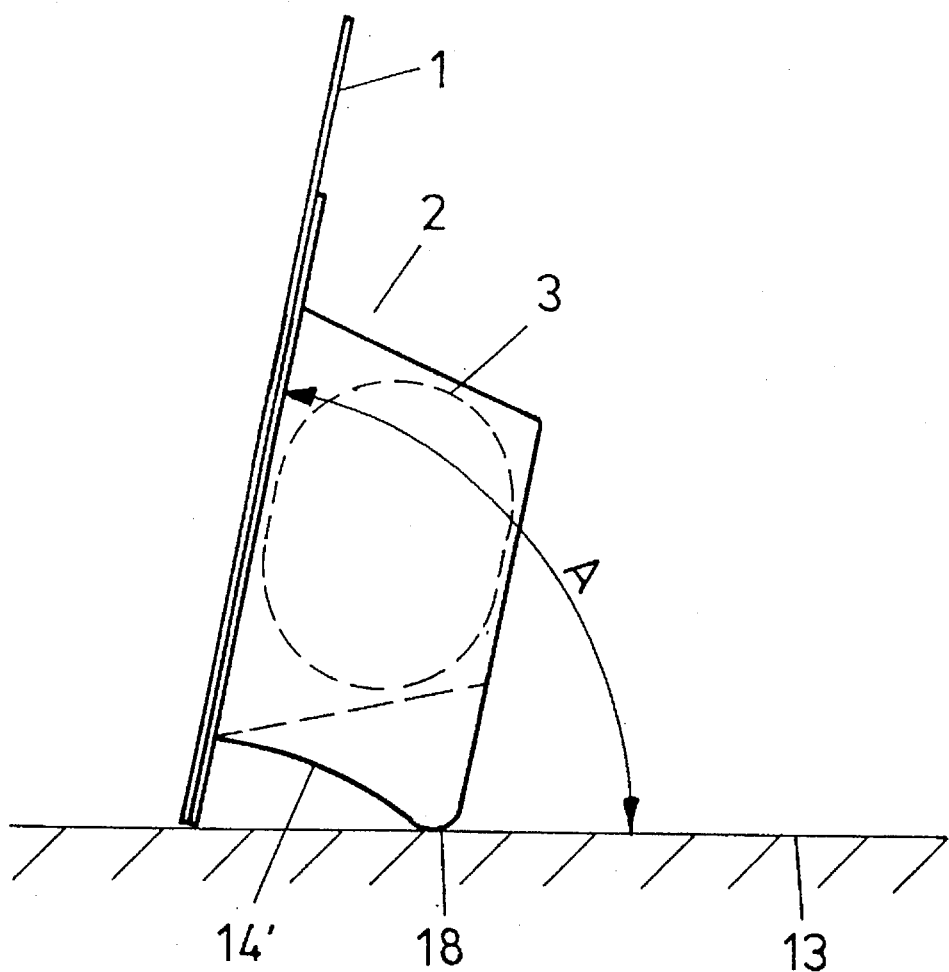
FIG. 3 is a side elevational view of an upright standing package according to another preferred embodiment of the invention.
Figure 4:
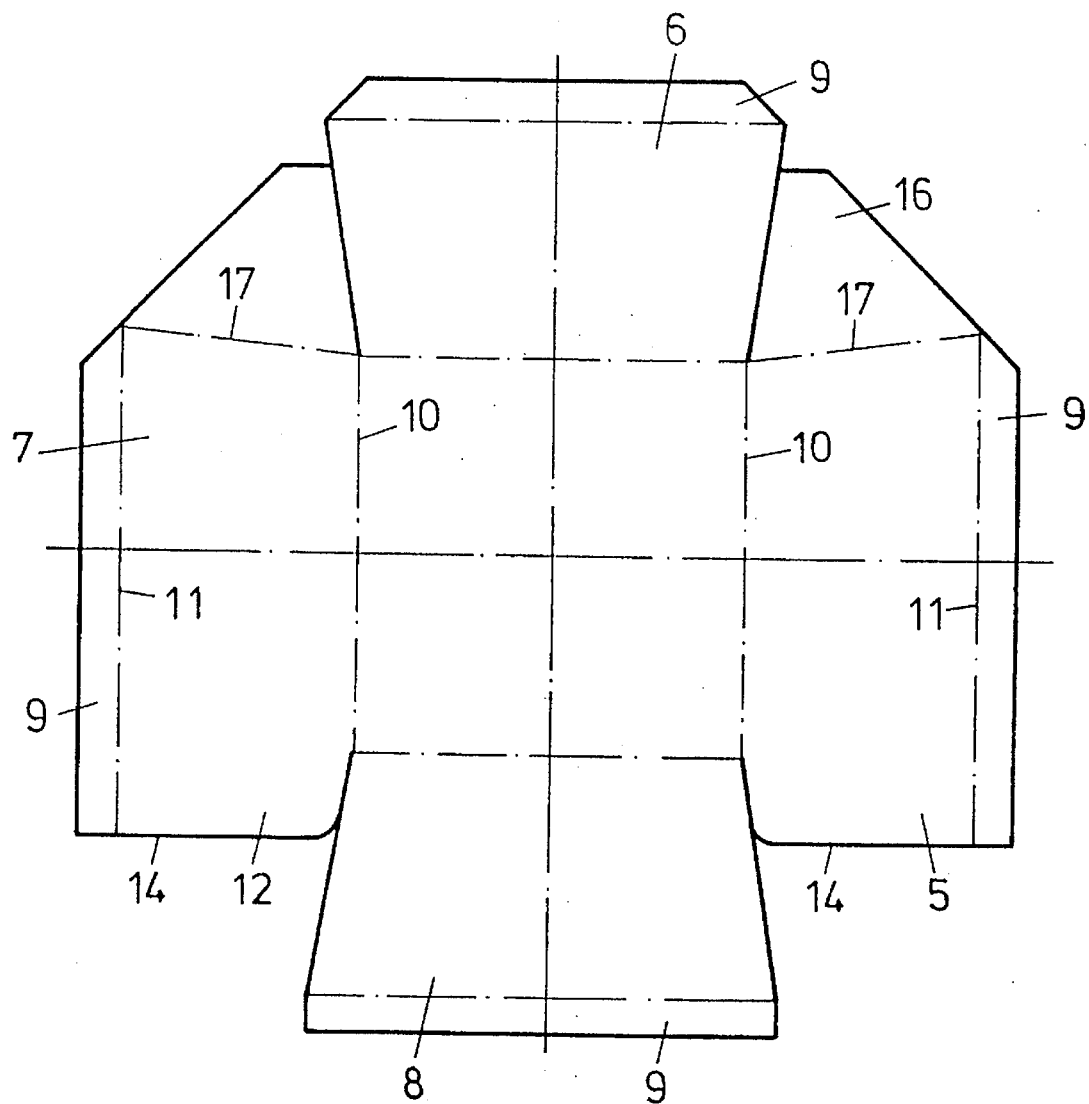
FIG. 4 is a developed blank of the hood part of the embodiment shown in FIGS. 1 and 2.

Two oppositely located side walls 5 and 7 are each provided with a panel 12 which projects beyond the plane of that side wall (designated at 8) which lies between the side walls 5 and 7 and which faces the support surface when the package is positioned upright thereon as illustrated in FIG. 2. The panels 12 are so arranged that, after the two parts 1 and 2 are attached to one another, their outer edges 14 are at least approximately flush with the edge 15 of the base part 1. In this manner, upon upright positioning of the package, the base part 1 is oriented perpendicularly to a supporting surface 13 (FIG. 2) or forms therewith an angle A between 75° and 90° or between 90° and 120° (FIG. 3). The consequence of a deviation from the perpendicular (as shown in FIG. 3) is a corresponding slight inclined positioning of the package which may be of advantage, for example, for a better legibility of a message printed on the base part 1 as shown, for example, in FIG. 3. The oblique positioning of the variant shown in FIG. 3 (where the angle A is approximately 80°) is achieved by an appropriate shaping of the panels 12 such that at least one region 18 of their outer edge 14' stands on the supporting surface 13 upon upright positioning of the package.

Thus, according to the invention, the external edges 14 (FIG. 2) or 14' (FIG. 3) of the panels 12 and the edge 15 of the base part 1 together define a standing plane for the upright positioning of the package on the supporting surface 13. Assuming a planar supporting surface 13, the standing plane of the package coincides with the plane of the supporting surface 13. In the FIG. 2 embodiment the external edges 14 of the panels 12 lie in their entirety in the standing plane, whereas in the FIG. 3 embodiment only one part of the external edges 14' of the panels 12 lies in (that is, define) the standing plane.

Dust protecting flaps 16 may be arranged at the side wall 6 situated opposite the side wall 8. The flaps 16 are connected with the side walls 5 and 7 at the edge lines 17 and are folded such that they are in a face-to-face engagement with the inner surface of the side wall 6 and may be bonded thereto. In this manner, the penetration of dust is prevented at these two transitional parts of the side walls 5, 6 and 7. Also, the flaps 16 act as reinforcements, lending the package a high stability.

It will be understood that the above description of the present invention is susceptible to various modifications, changes and adaptations, and the same are intended to be comprehended within the meaning and range of equivalents of the appended claims.

What is claimed is:

1. A package comprising
   (a) a planar base part bounded by a plurality of external edges; and
   (b) a hood part formed of a single blank and including
      (1) a top wall;
      (2) first, second, third and fourth side walls extending from and being oriented at an angle to said top wall; said first side wall being situated opposite said second side wall and said third side wall being situated opposite said fourth side wall; said third and fourth side walls connecting said first and second side walls to one another;
      (3) a flap joining each side wall and extending angularly therefrom; the flaps being secured face-to-face to said base part; and
      (4) first and second panels constituting integral, one-piece extensions of said first and second side walls, respectively; said first and second panels each having an external edge; said first and second panels projecting beyond a plane of said third side wall toward one of said external edges of said base part; said one external edge of said base part and said external edges of said first and second panels defining a standing plane for an upright positioning of the package on a supporting surface.

2. The package as defined in claim 1, wherein said standing plane is perpendicular to said planar base part.

3. The package as defined in claim 1, wherein said standing plane is at an angle of between 75° and 120° to said planar base part.

4. The package as defined in claim 1, wherein said external edges of said first and second panels lie entirely in said standing plane.

5. The package as defined in claim 1, wherein the external edges of said first and second panels have a first part lying in said standing plane and a second part lying externally of said standing plane.

* * * * *